(12) United States Patent
Tuten

(10) Patent No.: US 8,575,909 B2
(45) Date of Patent: Nov. 5, 2013

(54) SYNCHRONOUSLY SAMPLED SINGLE BIT SWITCH MODE POWER SUPPLY

(75) Inventor: Charles D. Tuten, Chandler, AZ (US)

(73) Assignee: QUALCOMM Incorporated, San Diego, CA (US)

( * ) Notice: Subject to any disclaimer, the term of this patent is extended or adjusted under 35 U.S.C. 154(b) by 334 days.

(21) Appl. No.: 12/884,827

(22) Filed: Sep. 17, 2010

(65) Prior Publication Data

US 2012/0068737 A1    Mar. 22, 2012

(51) Int. Cl.
*G05F 1/40*    (2006.01)

(52) U.S. Cl.
USPC ........................................ 323/282; 323/285

(58) Field of Classification Search
USPC ......... 323/207, 222, 224, 234, 272, 275, 266, 323/267, 282–288; 713/300, 310; 327/112, 327/170, 266; 363/17–19, 24, 21.05, 49, 65
See application file for complete search history.

(56) References Cited

U.S. PATENT DOCUMENTS

| | | | | |
|---|---|---|---|---|
| 4,541,041 A * | 9/1985 | Park et al. | ........................ | 363/41 |
| 4,630,187 A * | 12/1986 | Henze | ............................ | 363/41 |
| 6,157,182 A * | 12/2000 | Tanaka et al. | ................. | 323/284 |
| 6,169,680 B1 * | 1/2001 | Matsui et al. | ............... | 363/21.05 |
| 6,396,250 B1 * | 5/2002 | Bridge | ........................... | 323/283 |
| 6,570,368 B2 * | 5/2003 | Demizu | ........................ | 323/282 |
| 6,841,983 B2 * | 1/2005 | Thomas | ........................ | 323/322 |
| 7,038,512 B2 * | 5/2006 | Wilson et al. | ................. | 327/170 |
| 7,248,193 B2 * | 7/2007 | Fujimoto | ...................... | 341/143 |
| 7,279,995 B2 * | 10/2007 | Kernahan et al. | ............... | 331/57 |
| 2006/0083037 A1 * | 4/2006 | Leung et al. | .................... | 363/98 |
| 2009/0174262 A1 | 7/2009 | Martin et al. | | |
| 2010/0117615 A1 | 5/2010 | Prodic et al. | | |

OTHER PUBLICATIONS

International Search Report and Written Opinion—PCT/US2011/052008, International Search Authority—European Patent Office, May 21, 2012

* cited by examiner

*Primary Examiner* — Rajnikant Patel
(74) *Attorney, Agent, or Firm* — Kevin T. Cheatham

(57) ABSTRACT

A power supply is described. The power supply includes a synchronous sampled comparator. The synchronous sampled comparator includes a first input that receives a reference voltage. The synchronous sampled comparator also includes a second input that receives a feedback signal. The power supply also includes power field effect transistors (FETs). The power supply further includes an inductor coupled to the power FETs and coupled to the second input. The power FETs generate a power supply voltage using the inductor. The power supply voltage is a direct current (DC) power supply voltage.

32 Claims, 10 Drawing Sheets

SYNCHRONOUSLY SAMPLED SINGLE BIT SWITCH MODE POWER SUPPLY

TECHNICAL FIELD

The present disclosure relates generally to communication systems. More specifically, the present disclosure relates to systems and methods for a synchronously sampled single bit switch mode power supply.

BACKGROUND

Computing devices are widely deployed in diverse applications. These computing devices may be used in wireless communication systems, laptops and toys. Oftentimes the computing devices are located in battery operated devices.

Complex processors in the computing devices may be used. For example, high end smartphones may use complex processors to allow for increased functionality. Such processors may require a power supply voltage. Oftentimes, a power supply generating the power supply voltage may be located on the same integrated circuit as a complex processor. Thus, there is a need for the power supply to provide an accurate power supply voltage while minimizing the die area on the integrated circuit used for the power supply.

Providing a regulated power supply voltage may create additional problems in the form of unwanted frequencies in the power supply voltage. Tuning of the frequency of operation of a power supply may reduce the negative effects of this frequency.

SUMMARY

A power supply is described. The power supply includes a synchronous sampled comparator. The synchronous sampled comparator includes a first input that receives a reference voltage. The synchronous sampled comparator also includes a second input that receives a feedback signal. The power supply further includes power field effect transistors (FETs). The power supply also includes an inductor coupled to the power FETs and the second input. The power FETs generate a power supply voltage using the inductor. The power supply voltage is a direct current (DC) power supply voltage.

The synchronous sampled comparator may compare the reference voltage and the feedback signal at a sampling frequency. The synchronous sampled comparator may output a serial data stream corresponding to a relation between the reference voltage and the feedback signal. The power supply may also include gate drive circuitry that receives the serial data stream output by the synchronous sampled comparator. An output of the gate drive circuitry may be input to the power FETs.

The power FETs may provide a current to the inductor to generate the power supply voltage. The feedback signal may be the power supply voltage. The synchronous sampled comparator may output a serial data stream with a switching frequency. The switching frequency may produce a frequency on the power supply voltage. The switching frequency may be less than the sampling frequency.

The power supply may also include a programmable delay line that introduces a delay into the serial data stream that reduces the frequency of the serial data stream. The power supply may further include a frame length counter that determines a frame length of the switching frequency. The power supply may also include a comparison module that compares the frame length of the switching frequency with a desired frame length. The power supply may further include an integrator that determines an incremental increase/decrease to the delay that adjusts the frame length towards the desired frame length.

The desired frame length may correspond to a desired frequency of operation. The power supply may be used in a computing device. The desired frequency of operation may be selected to avoid interference with other frequencies used by the computing device. The power supply may be a synchronously sampled single bit switch mode power supply. The power supply may provide the power supply voltage to a processor. The power supply and the processor may be located on the same integrated circuit. The sampling frequency may be generated using a delay locked loop (DLL).

A method for providing a power supply voltage is also described. A serial data stream signal is generated using a synchronous sampled comparator. The synchronous sampled comparator outputs the serial data stream with a switching frequency. A current is provided to an inductor using power field effect transistors (FETs) to obtain a power supply voltage. The current provided to the inductor is adjusted using the serial data stream. The power supply voltage is fed back to the synchronous sampled comparator.

The power supply voltage may be provided to a processor. The synchronous sampled comparator may include a first input that receives a reference voltage. The synchronous sampled comparator may also include a second input that receives a feedback signal. The synchronous sampled comparator may generate the serial data stream corresponding to a relation between the reference voltage and the feedback signal. The synchronous sampled comparator may also compare the reference voltage and the feedback signal at a sampling frequency.

Providing a current to an inductor may include providing the serial data stream to gate drive circuitry. Providing a current to an inductor may also include providing the gate drive circuitry output to the power FETs. The power FETs may incrementally increase or decrease the current according to the serial data stream. The switching frequency of the serial data stream may produce a frequency on the power supply voltage. A delay may be introduced to the serial data stream. The delay may reduce the switching frequency of the serial data stream. The delay may be introduced to the serial data stream by a programmable delay line.

A frame length of the switching frequency may be determined. The frame length may be compared with a desired frame length. An incremental increase/decrease to the delay that adjusts the frame length toward the desired frame length may be determined. The delay introduced to the serial data stream may be adjusted by the incremental increase/decrease.

The desired frame length may correspond to a desired frequency of operation. The power supply may be used in a computing device. The desired frequency of operation may be selected to avoid interference with other frequencies used by the computing device. The method may be performed by a synchronously sampled single bit switch mode power supply. The power supply voltage may be provided to a processor. The synchronously sampled single bit switch mode power supply and the processor may be located on the same integrated circuit. The sampling frequency may be generated using a delay locked loop (DLL).

A computing device configured for providing a power supply voltage is described. The computing device includes means for generating a serial data stream signal using a synchronous sampled comparator. The synchronous sampled comparator outputs the serial data stream with a switching frequency. The computing device also includes means for providing a current to an inductor using power field effect transistors (FETs) to obtain a power supply voltage. The computing device further includes means for adjusting the current provided to the inductor using the serial data stream. The computing device also includes means for feeding back the power supply voltage to the synchronous sampled comparator.

A computer-readable medium encoded with computer-executable instructions is described. Execution of the computer-executable instructions is for generating a serial data stream signal using a synchronous sampled comparator. The synchronous sampled comparator outputs the serial data stream with a switching frequency. Execution of the computer-executable instructions is also for providing a current to an inductor using power field effect transistors (FETs) to obtain a power supply voltage. Execution of the computer-executable instructions is further for adjusting the current provided to the inductor using the serial data stream. Execution of the computer-executable instructions is also for feeding back the power supply voltage to the synchronous sampled comparator.

DETAILED DESCRIPTION

Figure 1:
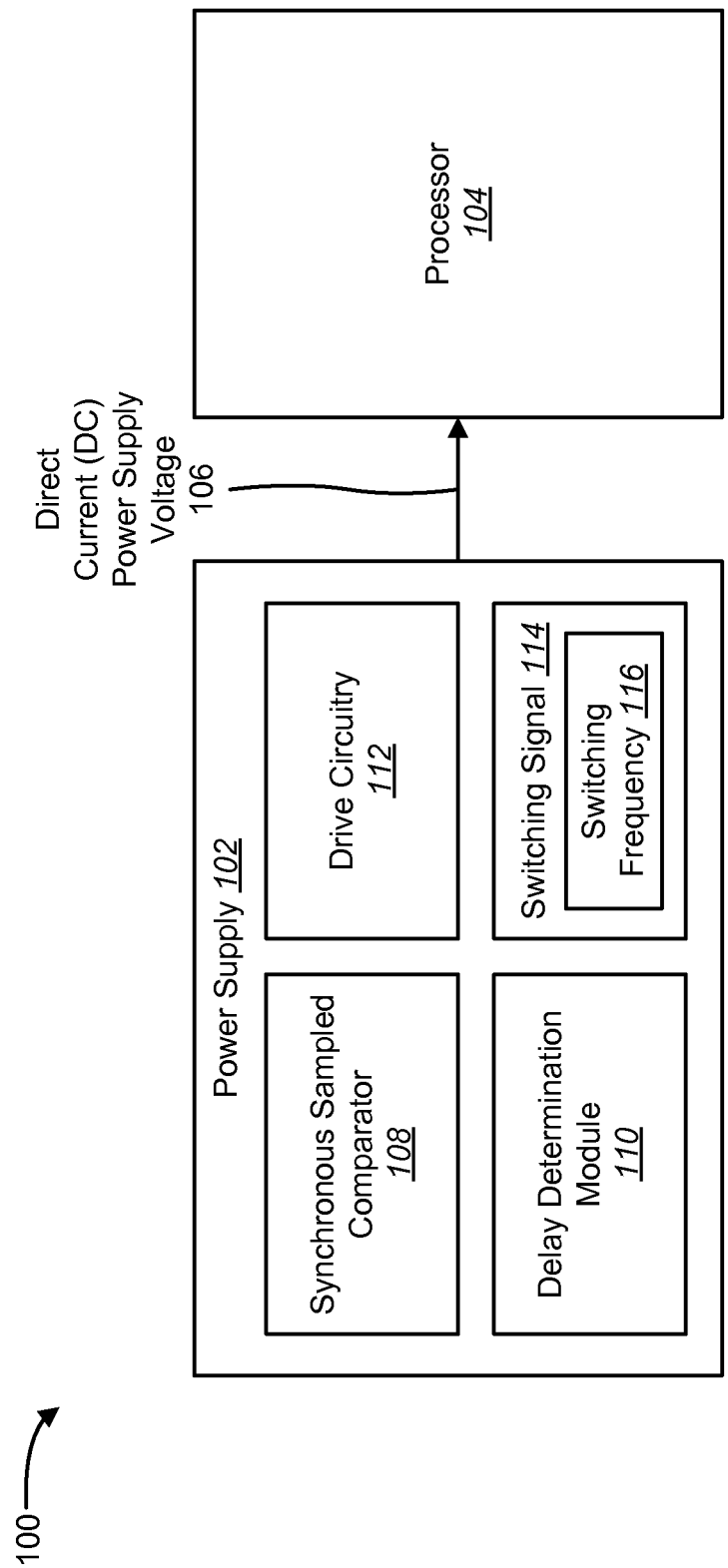
FIG. 1 shows a power supply providing a direct current (DC) power supply voltage to a processor.

FIG. 1 shows a power supply 102 providing a direct current (DC) power supply voltage 106 to a processor 104. The power supply 102 and the processor 104 may be part of a computing device 100. For example, the power supply 102 and the processor 104 may be part of a wireless device, a laptop, etc. In one configuration, the computing device 100 may be a base station or a wireless communication device. A base station is a station that communicates with one or more wireless communication devices. A base station may also be referred to as, and may include some or all of the functionality of, an access point, a broadcast transmitter, a Node B, an evolved Node B, etc. Each base station provides communication coverage for a particular geographic area.

A wireless communication device may also be referred to as, and may include some or all of the functionality of, a terminal, an access terminal, a user equipment (UE), a mobile device, a subscriber unit, a station, etc. A wireless communication device may be a cellular phone, a personal digital assistant (PDA), a wireless device, a wireless modem, a handheld device, a laptop computer, etc. A wireless communication device may communicate with zero, one or multiple base stations on the downlink (DL) and/or uplink (UL) at any given moment using an antenna. The downlink (or forward link) refers to the communication link from a base station to the wireless communication device, and the uplink (or reverse link) refers to the communication link from the wireless communication device to the base station.

Wireless communication systems may be multiple-access systems capable of supporting communication with multiple users by sharing the available system resources (e.g., bandwidth and transmit power). Examples of such multiple-access systems include code division multiple access (CDMA) systems, wideband code division multiple access (WCDMA), time division multiple access (TDMA) systems, frequency division multiple access (FDMA) systems, orthogonal frequency division multiple access (OFDMA) systems and spatial division multiple access (SDMA) systems.

The power supply 102 may be a synchronously sampled single bit switch mode power supply. The power supply 102 may be synchronously sampled. In other words, a clock signal may be sourced along with data within the power supply 102. For example, a synchronously sampled power supply may use a synchronous sampled comparator 108. Synchronous sampled comparators 108 are discussed in further detail below in relation to FIG. 3. The power supply 102 may be a single bit power supply. A single bit power supply may output a single bit data stream from the synchronous sampled comparator 108.

The power supply 102 may be a switched-mode power supply. In a switched mode power supply, an electronic power supply may incorporate a switching regulator to provide the direct current (DC) power supply voltage 106. The power supply 102 may include drive circuitry 112. The drive circuitry 112 may be a series of tapered buffers. In one configuration, the drive circuitry 112 may include gate drive circuitry and power field effect transistors (FETs). Drive circuitry 112 is discussed in additional detail below in relation to FIG. 3.

The power supply 102 may use the synchronous sampled comparator 108 to adjust a direct current (DC) power supply voltage 106. For example, the power supply 102 may use the synchronous sampled comparator 108 to obtain a switching signal 114 with a switching frequency 116. The power supply 102 may then adjust the direct current (DC) power supply voltage 106 at each rising edge (or falling edge) of the switching frequency 116 using the drive circuitry 112. The direct current (DC) power supply voltage 106 may be provided to a processor 104. In one configuration, the processor 104 and the power supply 102 may be located on the same integrated circuit. The processor 104 may be used in a computing device 100.

Adjusting the switching frequency 116 of the switching signal 114 may produce a frequency on the direct current (DC) power supply voltage 106. This frequency may disrupt the operation of the processor 104 and/or the operation of the computing device 100. For example, a frequency on the direct current (DC) power supply voltage 106 may negatively affect the operation of a wireless communication product by interfering with send/receive frequencies. The frequency on the direct current (DC) power supply voltage 106 may create noise spikes that collide with wireless communications, such as Bluetooth frequencies. Tuning of the frequency on the direct current (DC) power supply voltage 106 may avoid such negative effects.

To tune the frequency on the direct current (DC) power supply voltage 106, a variable delay may be introduced in the switching signal 114. The power supply 102 may use a delay determination module 110 to determine the appropriate variable delay introduced in the switching signal 114 to tune the direct current (DC) power supply voltage 106.

It may be beneficial for the direct current (DC) power supply voltage 106 to have minimal voltage drift. For example, as the processor 104 operates, large changes in the current required by the processor 104 may occur in relatively short periods of time (approximately 15 nanoseconds (ns)). If the direct current (DC) power supply voltage 106 drops by more than approximately 50 millivolts (mV), the performance of the processor 104 will be reduced. Likewise, if the direct current (DC) power supply voltage 106 overshoots by more than approximately 70 mV, transistors and the processor 104 may be damaged. Thus, it is important that the power supply 102 provide a fast transient direct current (DC) power supply voltage 106 with minimal voltage drift.

Figure 2:
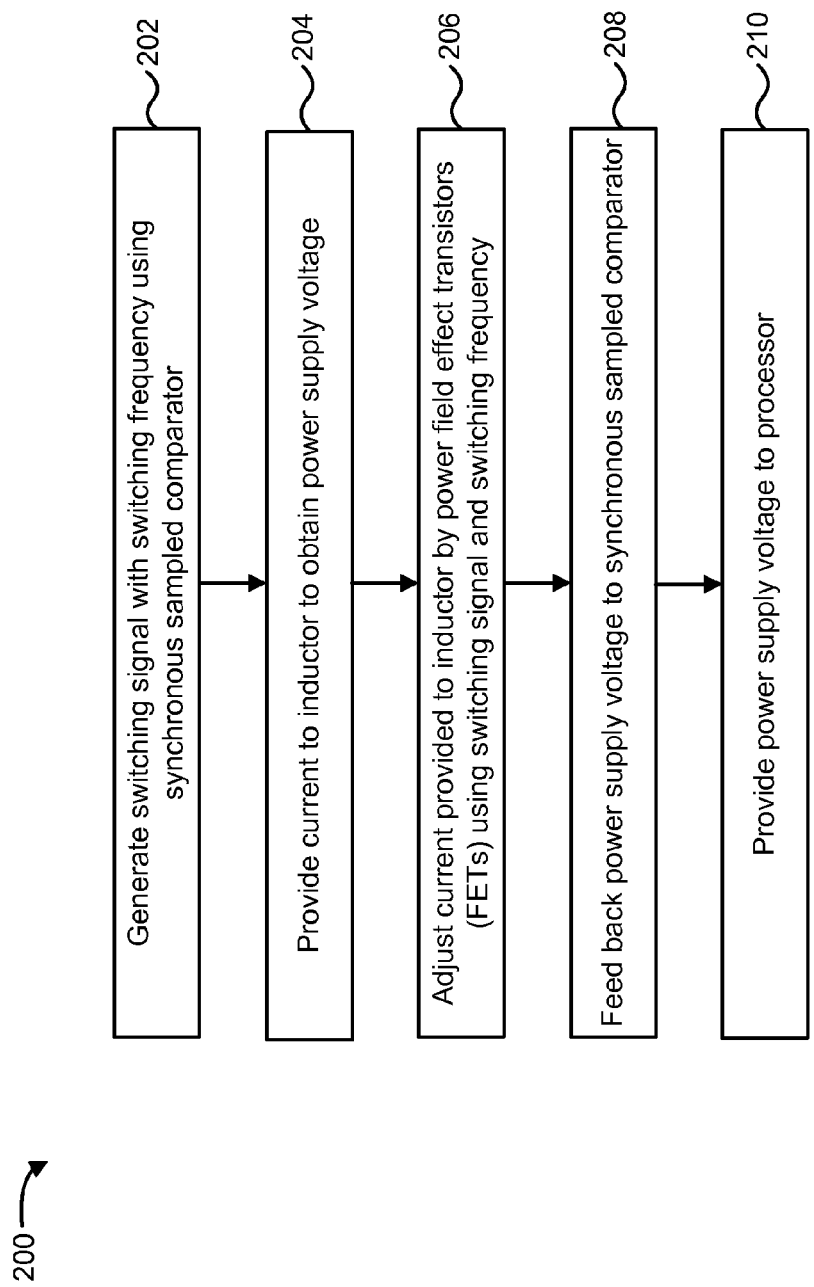
FIG. 2 is a flow diagram of a method for providing a power supply voltage.

FIG. 2 is a flow diagram of a method 200 for providing a power supply voltage. The power supply voltage may be a direct current (DC) power supply voltage 106 provided to a processor 104. The method 200 may be performed by a power supply 102. In one configuration, the power supply 102 may be a synchronously sampled single bit switch mode power supply. The power supply 102 may generate 202 a switching signal 114 with a switching frequency 116 using a synchronous sampled comparator 108. The power supply 102 may provide 204 a current to an inductor to obtain a power supply voltage. The power supply 102 may provide the current to the inductor using power field effect transistors (FETs).

The power supply 102 may adjust 206 the current provided to the inductor by the power field effect transistors (FETs) using the switching signal 114 and the switching frequency 116. For example, at each rising edge of the switching frequency 116, the power supply 102 may incrementally increase or decrease the amount of current provided to the inductor by the power field effect transistors (FETs). The power supply 102 may feedback 208 the power supply voltage to the synchronous sampled comparator 108. The power supply 102 may also provide 210 the power supply voltage to a processor 104.

Figure 3:
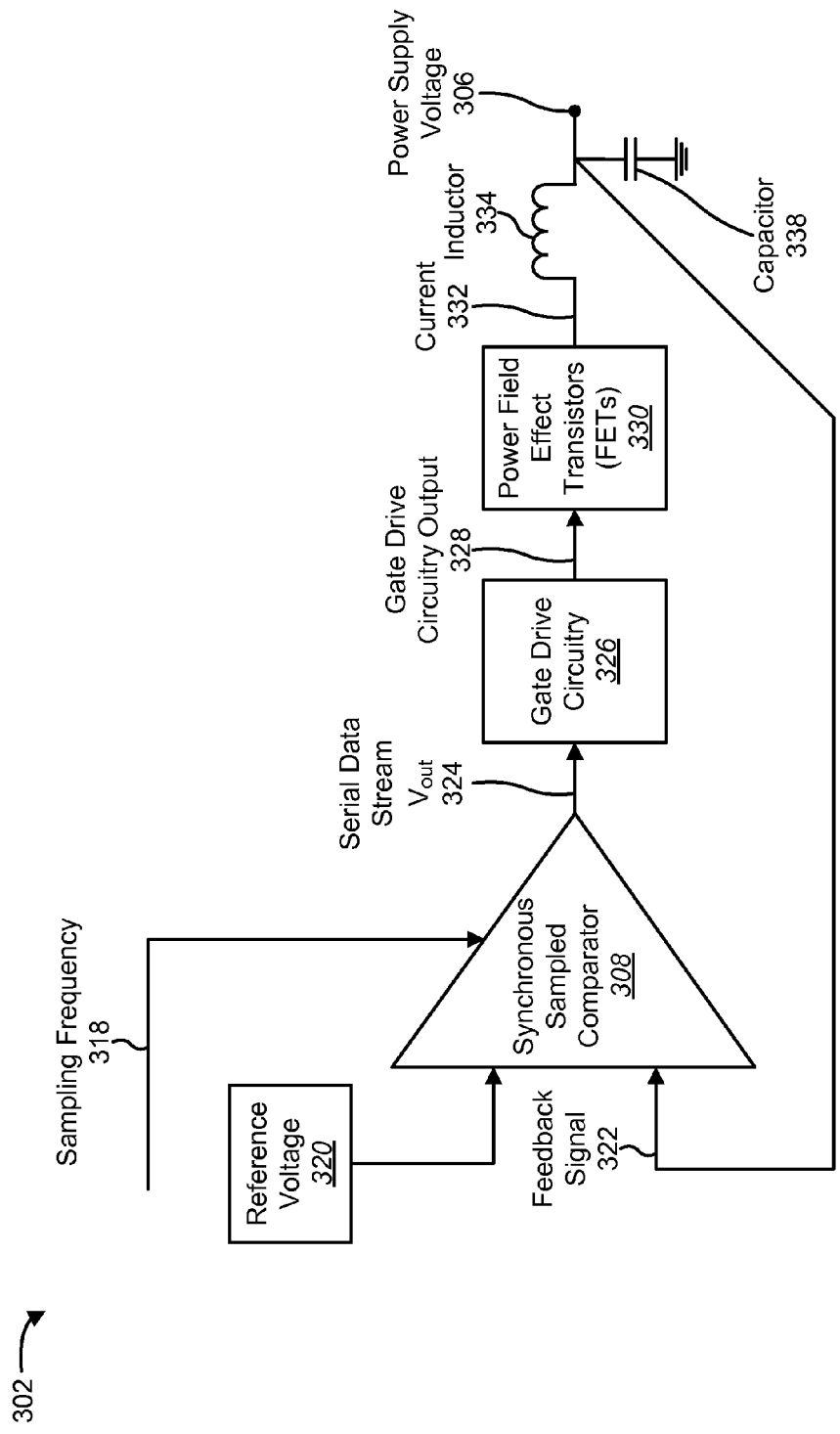
FIG. 3 is a block diagram illustrating various components of a synchronously sampled single bit switch mode power supply.

FIG. 3 is a block diagram illustrating various components of a synchronously sampled single bit switch mode power supply 302. The synchronously sampled single bit switch mode power supply 302 of FIG. 3 may be one configuration of the power supply 102 of FIG. 1. The synchronously sampled single bit switch mode power supply 302 may include a synchronous sampled comparator 308. The synchronous sampled comparator 308 may be designed to either operate with a variable sampling rate or with a variable threshold. The control over either the variable sampling rate or the variable threshold may be used for switching frequency regulation. Switching frequency regulation may also be achieved by inserting delay after the synchronous sampled comparator 308 before gate drive circuitry 326. Inserting delay after the synchronous sampled comparator 308 is discussed in further detail below in relation to FIG. 5.

The synchronous sampled comparator 308 may have a first input and a second input. The synchronous sampled comparator 308 may receive a reference voltage 320 on the first input of the synchronous sampled comparator 308. The reference voltage 320 may be a bandgap voltage needed by a processor 104 for proper operation.

The second input of the synchronous sampled comparator 308 may receive a feedback signal 322. In one configuration, the feedback signal 322 may be a power supply voltage 306.

The power supply voltage 306 may be the direct current (DC) power supply voltage 106 provided to a processor 104 or other circuitry. The synchronous sampled comparator 308 may also receive a sampling frequency 318. The sampling frequency 318 may control the sampling of the synchronous sampled comparator 308. In other words, the synchronous sampled comparator 308 may compare the reference voltage 320 and the feedback signal 322 at the sampling frequency 318 and output a single bit as part of a serial data stream Vout 324. The serial data stream Vout 324 of FIG. 3 may be one configuration of the switching signal 114 of FIG. 1. The sampling frequency 318 may be much higher than the switching frequency 116 of the synchronous sampled comparator 308. For example, in one configuration, the sampling frequency 318 may be 100 megahertz (MHz) and the switching frequency 116 of the synchronous sampled comparator 308 may be 10 MHz.

The synchronous sampled comparator 308 may compare the reference voltage 320 and the feedback signal 322 at each rising edge of the sampling frequency 318. Alternatively, the synchronous sampled comparator 308 may compare the reference voltage 320 and the feedback signal 322 at each falling edge of the sampling frequency 318. The serial data stream Vout 324 output by the synchronous sampled comparator 308 may thus be a series of ones and zeros.

The serial data stream Vout 324 may then be input into gate drive circuitry 326. The gate drive circuitry 326 may be a tapered buffer. For example, the gate drive circuitry 326 may include several progressively larger inverters. The output of the gate drive circuitry 326 may be referred to as the gate drive circuitry output 328. The gate drive circuitry output 328 may be input into power field effect transistors (FETs) 330. The power field effect transistors (FETs) 330 may include one or more large p-channel devices, hi-fi devices and n-channel devices. In one configuration, the gate drive circuitry output 328 may be coupled to the gates of the power field effect transistors (FETs) 330. The power field effect transistors (FETs) 330 may operate as a single large inverter. The power field effect transistors (FETs) 330 may be used to drive an inductor 334 to obtain a supply line on an integrated circuit.

The power field effect transistors (FETs) 330 may be coupled to a battery and to an inductor 334. According to the gate drive circuitry output 328, the power field effect transistors (FETs) 330 may either pull the voltage applied to the inductor 334 high or low. In other words, a digital high bit in the serial data stream Vout 324 may incrementally increase the current 332 applied to the inductor 334 by the power field effect transistors (FETs) 330. The power field effect transistors (FETs) 330 may act as a switch. The bitstream may generate a duty cycle that becomes a power field effect transistors (FETs) on/off time. The power field effect transistors (FETs) on/off time allows the inductor 334 to build up (or ramp up) the current 332. A higher duty cycle means a longer power field effect transistor (FET) 330 on times, which equals a higher current 332. A digital low in the serial data stream Vout 324 may incrementally decrease the current 332 applied to the inductor 334 by the power field effect transistors (FETs) 330. An incremental increase in the current 332 applied to the inductor 334 may incrementally increase the power supply voltage 306. Likewise, an incremental decrease in the current 332 applied to the inductor 334 may incrementally decrease the power supply voltage 306.

The power supply voltage 306 may be provided to additional circuitry. For example, the power supply voltage 306 may be provided to a processor 104. The power supply voltage 306 may be separated from ground by a capacitor 338. The capacitor 338 may filter the power supply voltage 306 output in conjunction with the inductor 334 (i.e., an LC filter) to produce a low ripple output voltage. The power supply voltage 306 may also be fed back to the synchronous sampled comparator 308. For example, the second input of the synchronous sampled comparator 308 may be coupled to the feedback signal 322 that is coupled to the power supply voltage 306.

Incrementally adjusting the power supply voltage 306 may introduce a frequency into the power supply voltage 306. The synchronously sampled single bit switch mode power supply 302 of FIG. 3 may be unable to adjust the frequency introduced into the power supply voltage 306. A synchronously sampled single bit switch mode power supply is discussed in FIG. 5, which allows for the adjustment of the frequency introduced into the power supply voltage 306.

Figure 4:
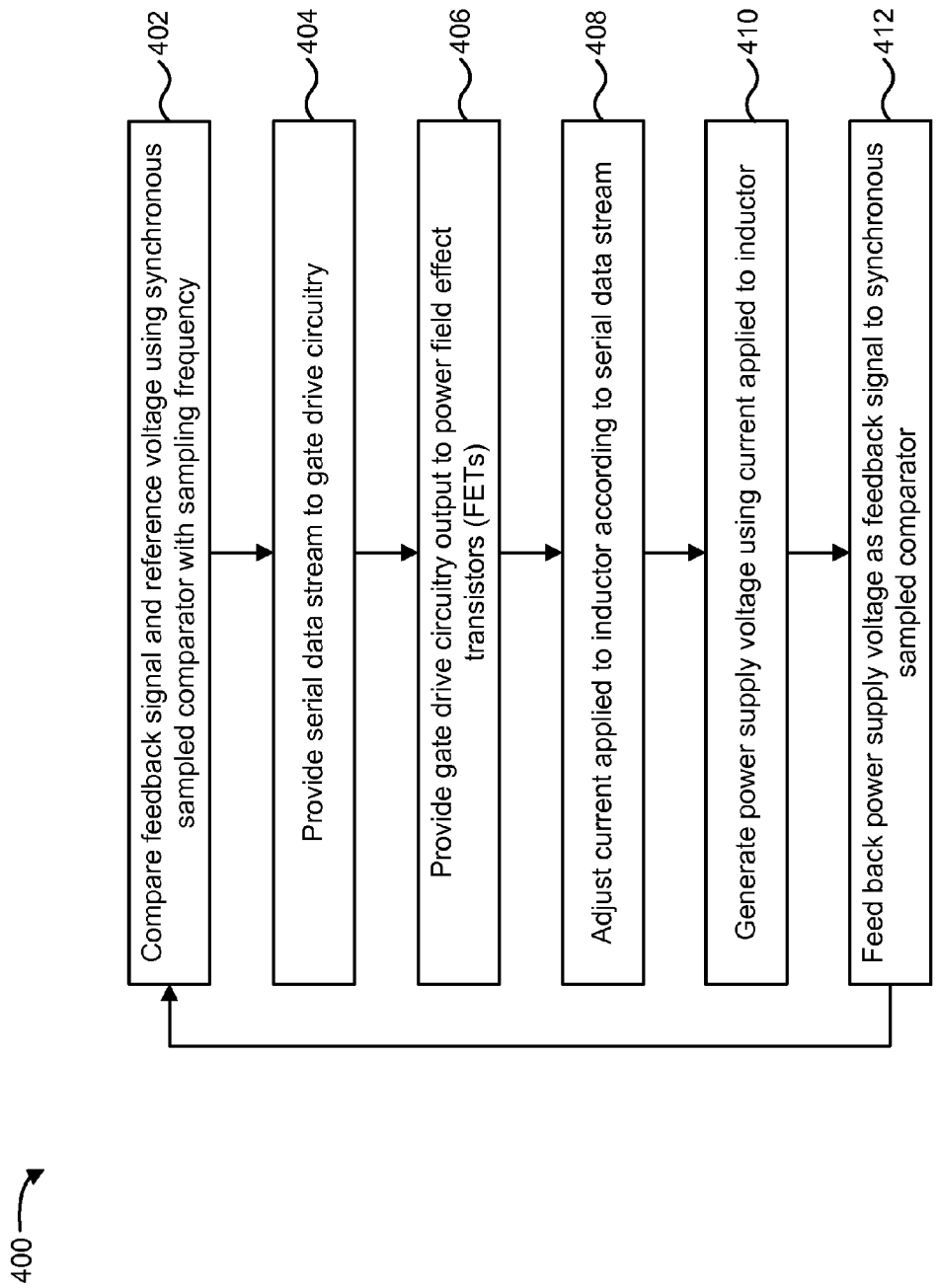
FIG. 4 is a flow diagram of a method for providing a power supply voltage using a synchronous sampled comparator.

FIG. 4 is a flow diagram of a method 400 for providing a power supply voltage 306 using a synchronous sampled comparator 308. The method 400 may be performed by a synchronously sampled single bit switch mode power supply 302. The synchronously sampled single bit switch mode power supply 302 may compare 402 a feedback signal 322 and a reference voltage 320 using a synchronous sampled comparator 308 with a sampling frequency 318. The output of the synchronous sampled comparator 308 may be referred to as the serial data stream Vout 324. The synchronously sampled single bit switch mode power supply 302 may provide 404 the serial data stream Vout 324 to gate drive circuitry 326. The output of the gate drive circuitry 326 may be referred to as the gate drive output 328.

The synchronously sampled single bit switch mode power supply 302 may then provide 406 the gate drive output 328 to power field effect transistors (FETs) 330. The synchronously sampled single bit switch mode power supply 302 may adjust 408 the current 332 applied to an inductor 334 according to the serial data stream Vout 324 using the power field effect transistors (FETs) 330. The synchronously sampled single bit switch mode power supply 302 may generate 410 a power supply voltage 306 using the current 332 applied to the inductor 334. The synchronously sampled single bit switch mode power supply 302 may feed back 412 the power supply voltage 306 as the feedback signal 322 to the synchronous sample comparator 308. The synchronously sampled single bit switch mode power supply 302 may then return to comparing 402 the feedback signal 322 and the reference voltage 320 using the synchronous sampled comparator 308.

Figure 5:
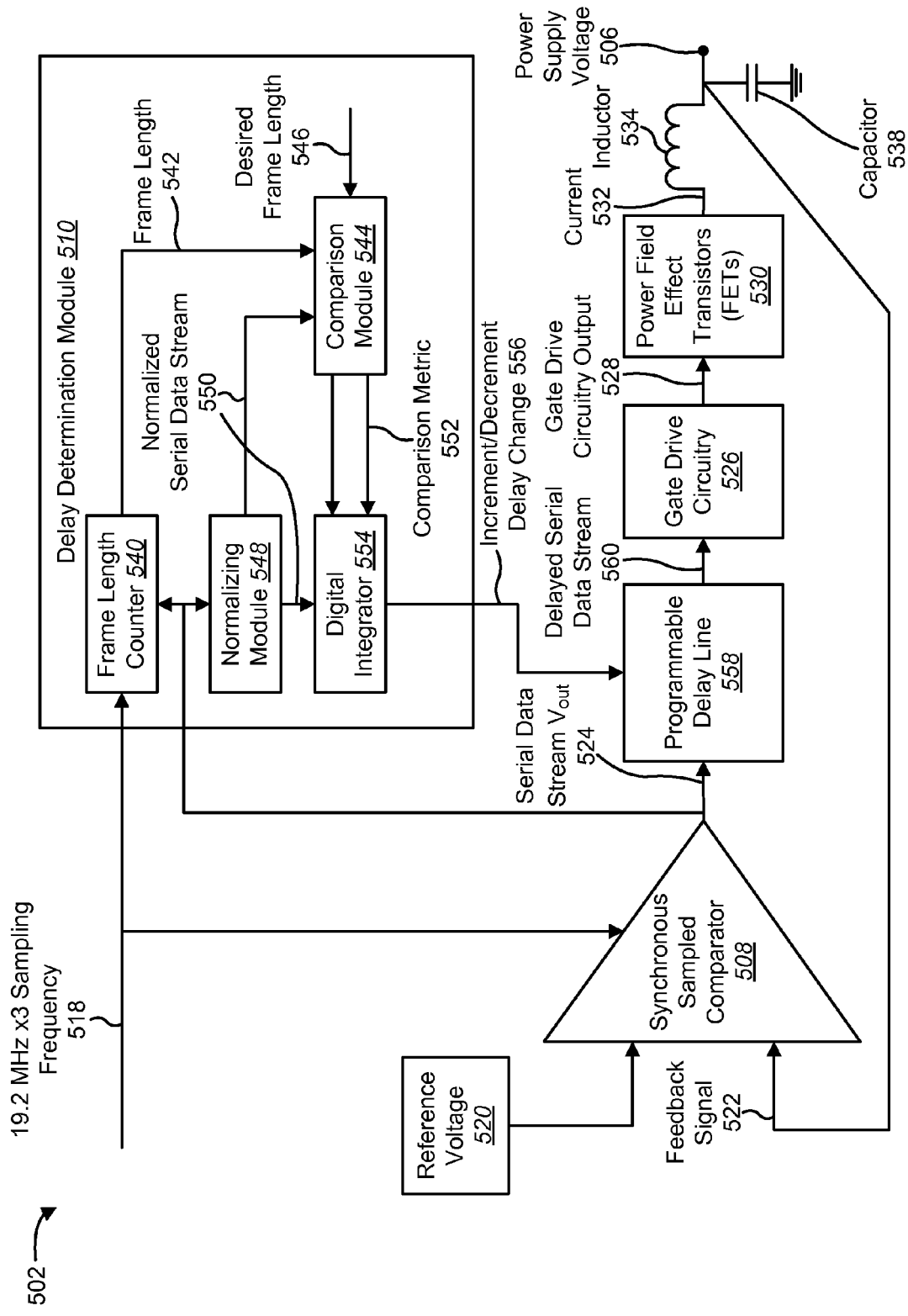
FIG. 5 is a block diagram illustrating a synchronously sampled single bit switch mode power supply with tuning capability.

FIG. 5 is a block diagram illustrating a synchronously sampled single bit switch mode power supply 502 with tuning capability. The synchronously sampled single bit switch mode power supply 502 of FIG. 5 may be one configuration of the power supply 102 of FIG. 1. The synchronously sampled single bit switch mode power supply 502 may include a synchronous sampled comparator 508. The synchronous sampled comparator 508 may have a first input and a second input. The first input of the synchronous sampled comparator 508 may receive a reference voltage 520. The reference voltage 520 may represent the ideal voltage to be generated by the synchronously sampled single bit switch mode power supply 502. The second input of the synchronous sampled comparator 508 may receive a feedback signal 522. The feedback signal 522 may be the power supply voltage 506 generated by the synchronously sampled single bit switch mode power supply 502.

The synchronous sampled comparator 508 may also receive a sampling frequency 518. In one configuration, the sampling frequency 518 may be 19.2 MHz*3. For example, the sampling frequency 518 may be approximately 60 MHz. The synchronous sampled comparator 508 may then output a serial data stream Vout 524. The serial data stream Vout 524 of FIG. 5 may be one configuration of the switching signal 114 of FIG. 1. The serial data stream Vout 524 may be output with a switching frequency 116. Due to delays in the synchronous sampled comparator 508, the switching frequency 116 may be less than the sampling frequency 518.

The synchronously sampled single bit switch mode power supply 502 may include a delay determination module 510. The delay determination module 510 of FIG. 5 may be one configuration of the delay determination module 110 of FIG. 1. The delay determination module 510 may use digital signal processing. A frame length counter 540 in the delay determination module 510 may receive the sampling frequency 518 and the serial data stream Vout 524. The frame length counter 540 may then determine a frame length 542. In a constant frequency, the frame length 542 refers to the distance (measured in time) between each rising edge of the frequency. The frame length counter 540 may count the number of samples from a first "01" transition to the next "01" transition. In order to get an accurate frame length 542, the frame length counter 540 needs to run at the same frequency as the data stream.

The delay determination module 510 may include a normalizing module 548. The normalizing module 548 may receive the serial data stream Vout 524 from the synchronous sampled comparator 508. The normalizing module 548 may then output a normalized serial data stream 550. In one configuration, the normalizing module 548 may divide the serial data stream Vout 524 by eight to obtain the normalized serial data stream 550. A comparison module 544 may receive the normalized serial data stream 550, the frame length 542 and a desired frame length 546. The desired frame length 546 may refer to the frame length of a desired frequency of operation. The desired frequency of operation may be obtained from many sources, such as from memory on the synchronously sampled single bit switch mode power supply 502, from a processor, or from an external source. Tuning is continuously performed. The desired frame length 546 may be changed by external means. For example, the desired frame length 546 may change based upon what radio frequency (RF) signals are running Bluetooth, CDMA, GSM, etc.

The desired frequency of operation may include a band of acceptable frequencies. The desired frequency of operation may be such that the switching frequency of the serial data stream is sufficiently separate from frequencies used by the computing device 100 using the synchronously sampled single bit switch mode power supply 502. If the switching frequency is not properly selected, the harmonics of the switching frequency may interfere with the radio frequency (RF). Harmonics may occur at multiples of the switching frequency (e.g., at a frequency of f, harmonics may occur at 2f, 3f, 4f . . . ) with the magnitude decreasing for harmonics that are further away from the main frequency. For example, the desired frequency may ensure that the switching frequency 116 is not the same frequency as a transmit frequency or receive frequency in a wireless communication device. In one configuration, the desired frequency may include a listing of unacceptable frequencies. The comparison module 544 may then output a comparison metric 552. The comparison metric 552 may reflect a comparison between the current frame length 542, the normalized serial data stream 550 and the desired frame length 546.

A digital integrator 554 may receive the comparison metric 552 and the normalized serial data stream 550. The digital integrator 554 may output an increment/decrement delay change 556. A programmable delay line 558 may receive the increment/decrement delay change 556 and the serial data stream Vout 524. The programmable delay line 558 may introduce a delay to the serial data stream Vout 524. As an example, the delay may be between 0 and 50 nanoseconds (ns). The increment/decrement delay change 556 may be 0.5 ns. Based on the increment/decrement delay change 556, the programmable delay line 558 may increase or decrease the delay introduced to the serial data stream Vout 524. A delay added to the serial data stream Vout 524 may decrease the switching frequency 116 of the serial data stream Vout 524 by increasing the amount of time between each change made to the power supply voltage 506.

The delay may be introduced to the serial data stream Vout 524 in a completely digital manner. The delay may be introduced using counters, digital averaging filters, digital integrators 554 and gate delays. With respect to other solutions for adjusting the switching frequency 116 of a power supply 102, the use of delay has a simple circuit implementation, a minimum die area, minimum analog components and a fast transient response.

The programmable delay line 558 may output a delayed serial data stream 560. The delayed serial data stream 560 may be amplified using gate drive circuitry 526. The gate drive circuitry output 528 may then be input into power field effect transistors (FETs) 530. The power field effect transistors (FETs) 530 may generate a current 532. Depending on the gate drive circuitry output 528, the power field effect transistors (FETs) 530 may incrementally increase or decrease the generated current 532. The generated current 532 may be passed through an inductor 534, creating a power supply voltage 506. As discussed above, the power supply voltage 506 may be used to drive integrated circuitry such as a processor 104. The power supply voltage 506 may be separated from ground by a capacitor 538. The power supply voltage 506 may also be used as the feedback signal 522 for the synchronous sampled comparator 508.

In principle, the synchronously sampled singe bit switch mode power supply 502 operates as a conventional hysteretic controller, where digital logic is used to overcome the main disadvantages of such a control technique. In particular, the delay determination module 510 (and corresponding programmable delay line 558) may eliminate problems related to the variable frequency of operation.

Along with delay, additional features incorporating digital logic may also be added to the synchronously sampled single bit switch mode power supply 502. For example, such additional features like programmability of start up sequence, indirect monitoring of input voltage, pulse-frequency modulation (PFM) operation and switching frequency 116 dithering for electromagnetic interference reduction (EMI) may be implemented. The effective switching frequency 116 of the synchronously sampled single bit switch mode power supply 502 may be dependent upon the response time of the system.

The switching frequency 116 may be controlled by changing the threshold of the synchronous sampled comparator 508. With "zero-threshold," the highest switching frequency 116 possible may be obtained. Increasing the threshold of the synchronous sampled comparator 508 may delay the response of the system and thereby lower the switching frequency 116.

The switching frequency 116 may also be controlled by changing the sampling frequency 518 of the synchronous sampled comparator 508. Increasing the sampling rate 518 has the effect of reducing the response time of the controller, thereby increasing the switching frequency 116. Decreasing the sampling rate 518 has the effect of decreasing the switching frequency 116.

Figure 6:
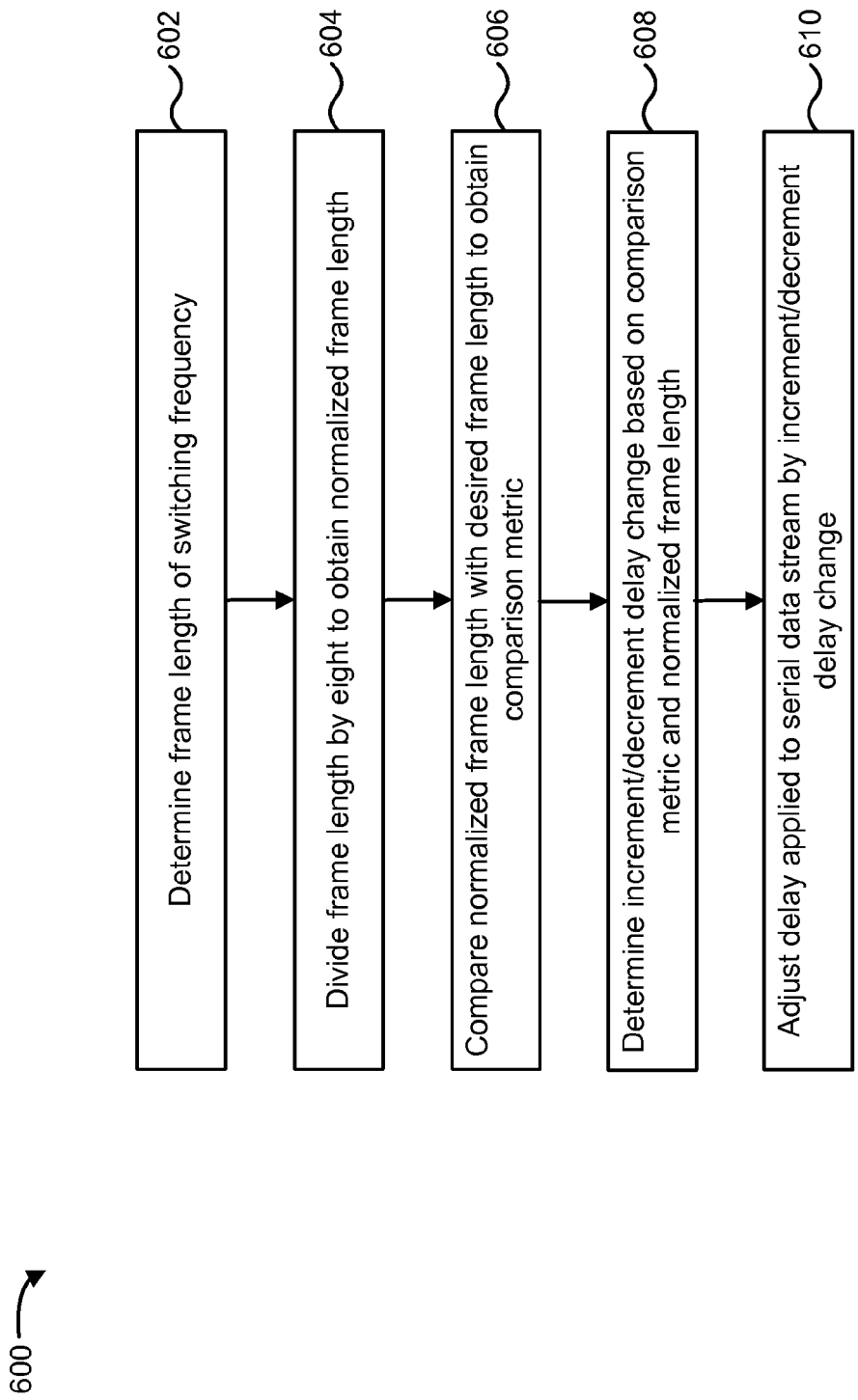
FIG. 6 is a flow diagram of a method for determining a change in delay introduced into a serial data stream.

FIG. 6 is a flow diagram of a method 600 for determining a change in delay introduced into a serial data stream 524. The method of FIG. 6 may be performed by a synchronously sampled single bit switch mode power supply 502. In one configuration, the method 600 of FIG. 6 may be performed by a digital signal processor on the synchronously sampled single bit switch mode power supply 502. The synchronously sampled single bit switch mode power supply 502 may determine 602 a frame length 542 of a switching frequency 116. As discussed above, the switching frequency 116 may be the frequency of a serial data stream Vout 524 output by a synchronous sampled comparator 508. The synchronously sampled single bit switch mode power supply 502 may divide 604 the frame length 542 by eight to obtain a normalized frame length 542.

The synchronously sampled single bit switch mode power supply 502 may compare 606 the normalized frame length 542 with a desired frame length 546 to obtain a comparison metric 552. As discussed above, the comparison metric 552 may indicate the difference between the current frame length 542 and the desired frame length 546. The comparison metric 552 may also indicate whether the current frame length 542 is greater or less than the desired frame length 546. The synchronously sampled single bit switch mode power supply 502 may determine 608 an increment/decrement delay change 556 based on the comparison metric 552 and the normalized frame length 542. The synchronously sampled single bit switch mode power supply 502 may then adjust 610 the delay introduced to the serial data stream Vout 524 by the increment/decrement delay change 556.

Figure 7:
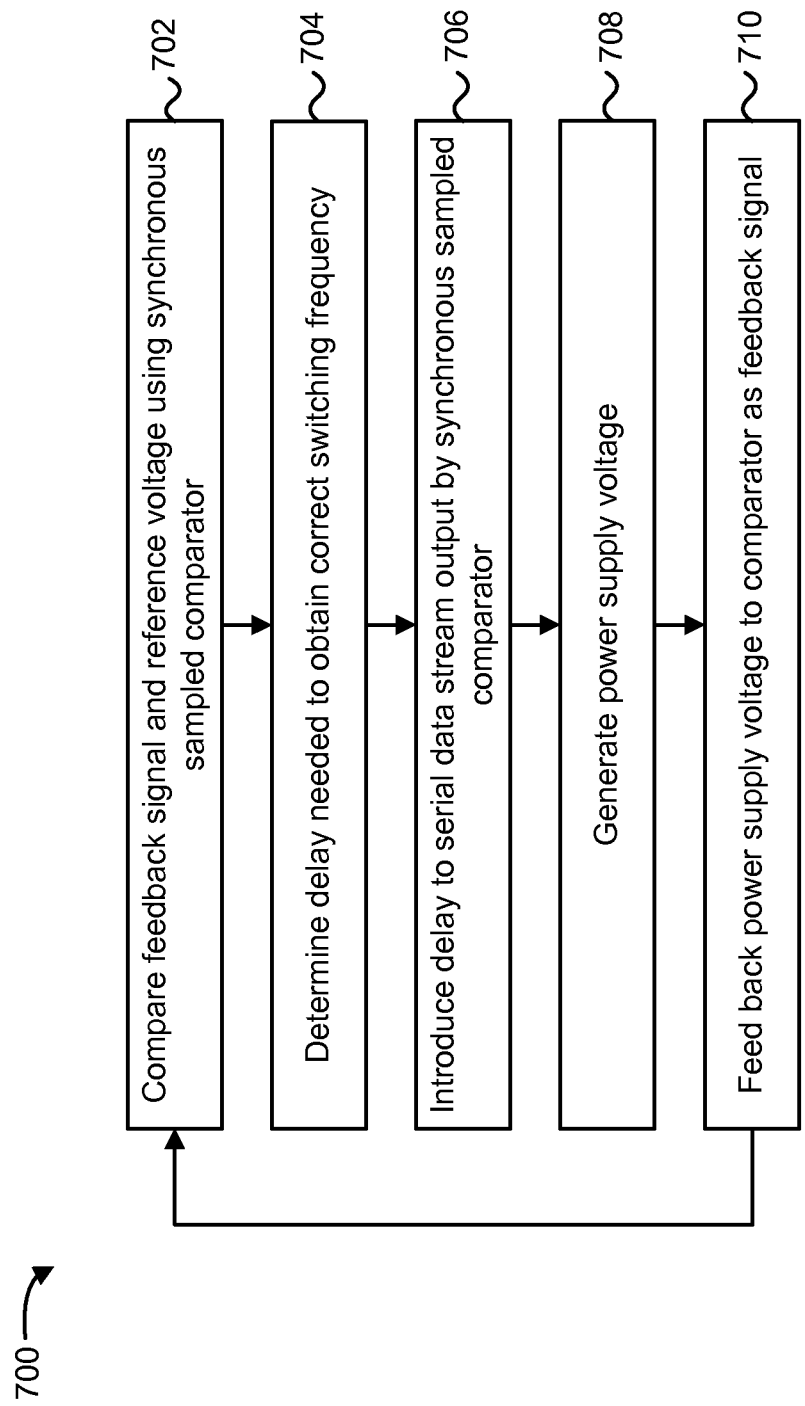
FIG. 7 is a flow diagram of a method for tuning the switching frequency of a serial data stream in a synchronously sampled single bit switch mode power supply.

FIG. 7 is a flow diagram of a method 700 for tuning the switching frequency 116 of a serial data stream 524 in a synchronously sampled single bit switch mode power supply 502. The method 700 may be performed by the synchronously sampled single bit switch mode power supply 502. The synchronously sampled single bit switch mode power supply 502 may compare 702 a feedback signal 522 and a reference voltage 520 using a synchronous sampled comparator 508. The synchronous sampled comparator 508 may use a sampling frequency 518. The synchronous sampled comparator 508 may output a serial data stream Vout 524 with a switching frequency 116. The synchronously sampled single bit switch mode power supply 502 may determine 704 a delay needed to obtain a correct switching frequency 116. For example, the synchronously sampled single bit switch mode power supply 502 may determine whether the current frame length 542 is greater than or less than a desired frame length 546.

The synchronously sampled single bit switch mode power supply 502 may introduce 706 the delay to the serial data stream Vout 524 output by the synchronous sampled comparator 508. Introducing delay to the serial data stream Vout 524 may decrease the switching frequency 116 of the serial data stream Vout 524. By adjusting the amount of delay introduced to the serial data stream Vout 524, the switching frequency 116 of the serial data stream Vout 524 may be tuned. The synchronously sampled single bit switch mode power supply 502 may generate 708 a power supply voltage 506. The synchronously sampled single bit switch mode power supply 502 may then feedback 710 the power supply voltage 506 to the synchronous sampled comparator 508 as the feedback signal 522. The synchronously sampled single bit switch mode power supply 502 may then again compare 702 the feedback signal 522 and the reference voltage 520.

Figure 8:
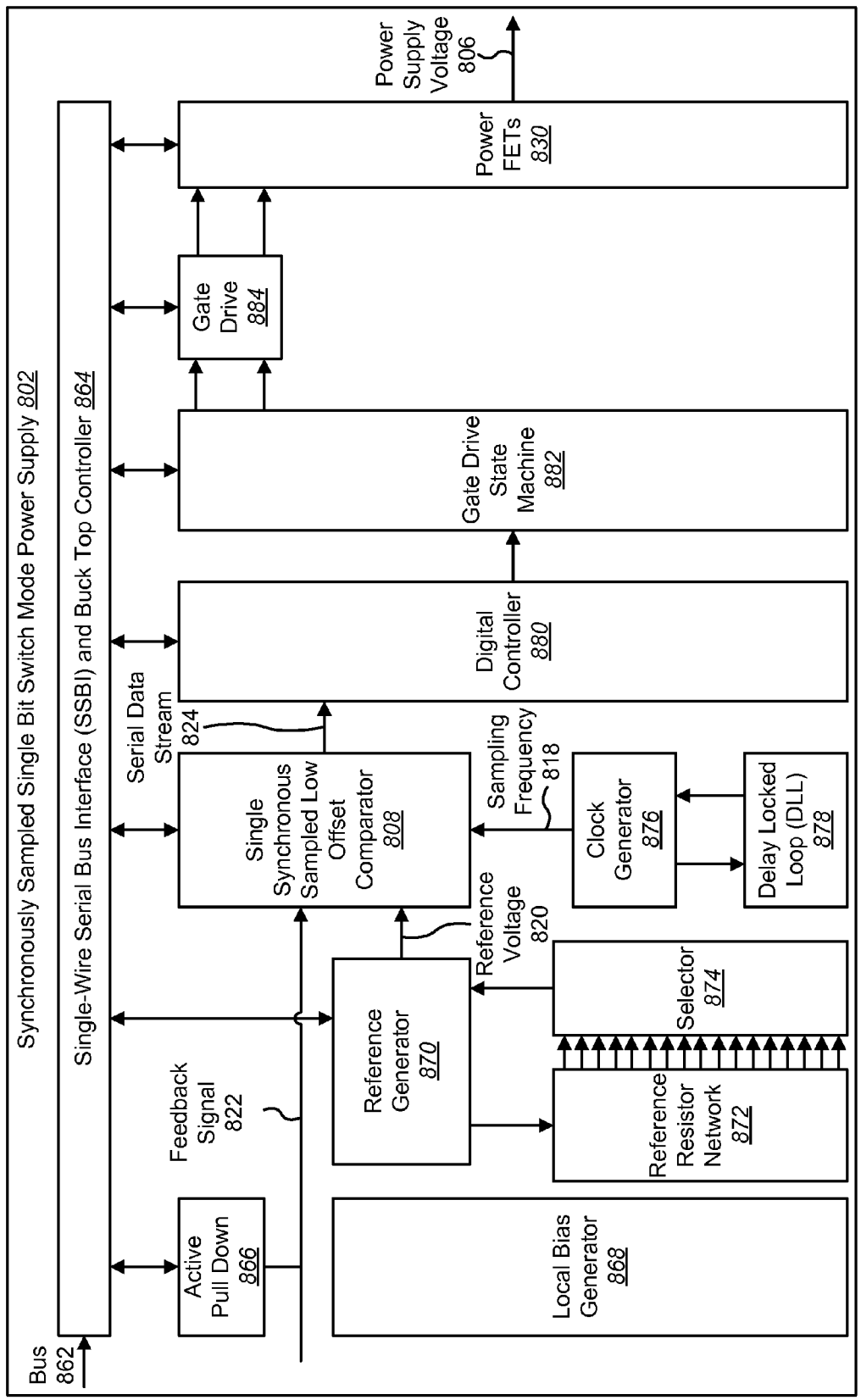
FIG. 8 is a block diagram illustrating another configuration of a synchronously sampled single bit switch mode power supply.

FIG. 8 is a block diagram illustrating another configuration of a synchronously sampled single bit switch mode power supply 802. The synchronously sampled single bit switch mode power supply 802 of FIG. 8 may be one configuration of the power supply 102 of FIG. 1. The synchronously sampled single bit switch mode power supply 802 may include a single-wire serial bus interface (SSBI) and buck top controller 864 (for house keeping, setup, etc.). The SSBI and buck top controller 864 may provide a digital interface between a bus signal 862 and an active pull down 866, a reference generator 870, a single synchronous sampled low offset comparator 808, a digital controller 880, a gate drive state machine 882, a gate drive 884 and power field effect transistors (FETs) 830. The single synchronous sampled low offset comparator 808 of FIG. 8 may be one configuration of the synchronous sampled comparator 108 of FIG. 1.

An active pull down 866 may couple the SSBI and buck top controller 864 to a feedback signal 822. The active pull down 866 may discharge the output voltage when the supply is turned off. The active pull down 866 may not be used during the operation in single bit mode. The synchronously sampled single bit switch mode power supply 802 may include a local bias generator 868 that supplies a bias to the analog circuitry such as the delay locked loop (DLL) 878, reference generator 870, active pull down 866 and the single synchronous samples low offset comparator 808.

The single synchronous sampled low offset comparator 808 may receive the feedback signal 822 and a reference voltage 820 generated by the reference generator 870. The reference generator 870 may use a reference resistor network 872 and a selector 874 to generate the reference voltage 820.

The single synchronous sampled low offset comparator 808 may receive a sampling frequency 818 from a clock generator 876. The clock generator 876 may generate the sampling frequency 818 using a delay locked loop (DLL) 878. In one configuration, the sampling frequency 818 may be approximately 60 MHz. The single synchronous sampled low offset comparator 808 may then output a serial data stream 824. As discussed above, the serial data stream 824 may have a switching frequency 116. Due to delays in the single synchronous sampled low offset comparator 808, the switching frequency 116 may be much lower than the sampling frequency 818. In one configuration, the switching frequency 116 may be approximately 10 MHz.

The single synchronous sampled low offset comparator 808 may output the serial data stream 824 to a digital controller 880. The digital controller 880 may provide the serial data stream 824 to a gate drive state machine 882. The gate drive machine 882 may then provide the serial data stream 824 to a gate drive 884. The output of the gate drive 884 may be provided to power field effect transistors (FETs) 830. The power field effect transistors (FETs) 830 may output a power supply voltage 806.

Figure 9:
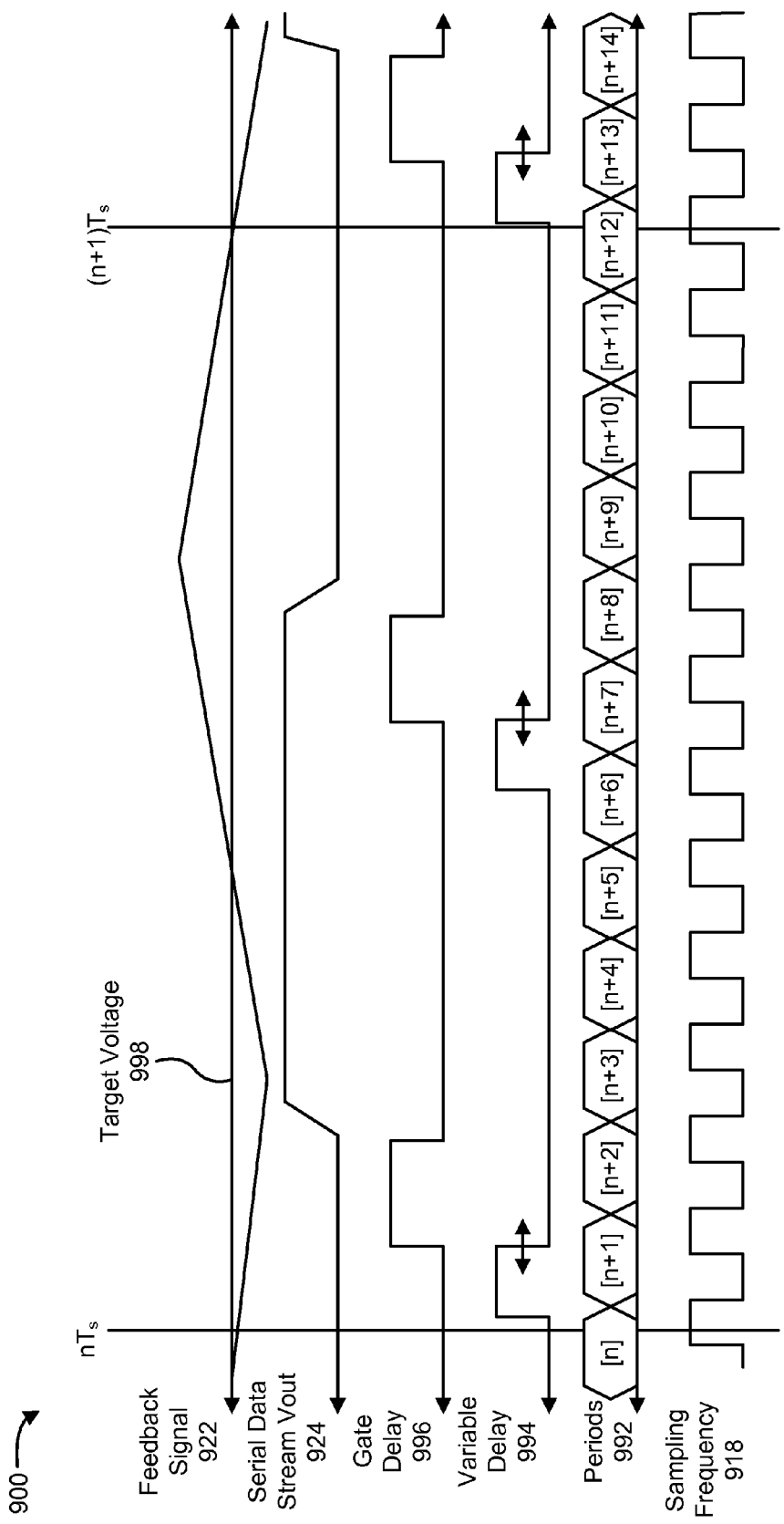
FIG. 9 is a timing diagram for a synchronously sampled single bit switch mode power supply.

FIG. 9 is a timing diagram 900 for a synchronously sampled single bit switch mode power supply 502. The sampling frequency 918 is illustrated. The sampling frequency 918 may have a rising edge at the beginning of each period n 992. The sampling frequency 918 may have a falling edge within each period n 992. The variable delay 994 is also illustrated. The variable delay 994 may be triggered by a 0 to 1 transition or a 1 to 0 transition from the single synchronous sampled low offset comparator 808. The variable delay 994 may represent the delay added to a serial data stream 924 by the programmable delay line 558.

The gate delay 996 is also illustrated. The falling edge of the variable delay 994 may trigger the rising edge of the gate delay 996. The gate delay 996 may represent inherent delay in the gate drive circuitry 526. The serial data stream Vout 924 is illustrated. The falling edge of the gate delay 996 may trigger the rising edge of the serial data stream Vout 924 when the serial data stream Vout 924 is at a digital low. The falling edge of the gate delay 996 may also trigger the falling edge of the serial data stream Vout 924 when the serial data stream Vout 924 is at a digital high.

The feedback signal 922 is also illustrated. As discussed above, the feedback signal 922 may be the power supply voltage 106. The feedback signal 922 may be a direct current (DC) signal. Due to processor 104 requirements, the voltage of the feedback signal 922 may drift away from the target voltage 998. The target voltage 998 may be the reference voltage 820 generated by the reference generator 870. A rising edge in the serial data stream Vout 924 may trigger an incremental increase in the feedback signal 922. A falling edge in the serial data stream Vout 924 may trigger an incremental decrease in the feedback signal 922.

The incremental increasing and decreasing of the feedback signal 922 may have a frequency. With no delay, the incremental increasing and decreasing of the feedback signal 922 may have a frequency equal to the switching frequency 116 of the serial data stream Vout 924. By introducing delay, the frequency of the incremental increasing and decreasing of the feedback signal 922 may be adjusted or tuned. By increasing the variable delay 994, the frequency of the incremental increasing and decreasing of the feedback signal 922 may be decreased (because the period Ts is increased and period=1/frequency). Likewise, by decreasing the variable delay 994, the frequency of the incremental increasing and decreasing of the feedback signal 922 may be increased (because the period Ts is decreased).

Figure 10:
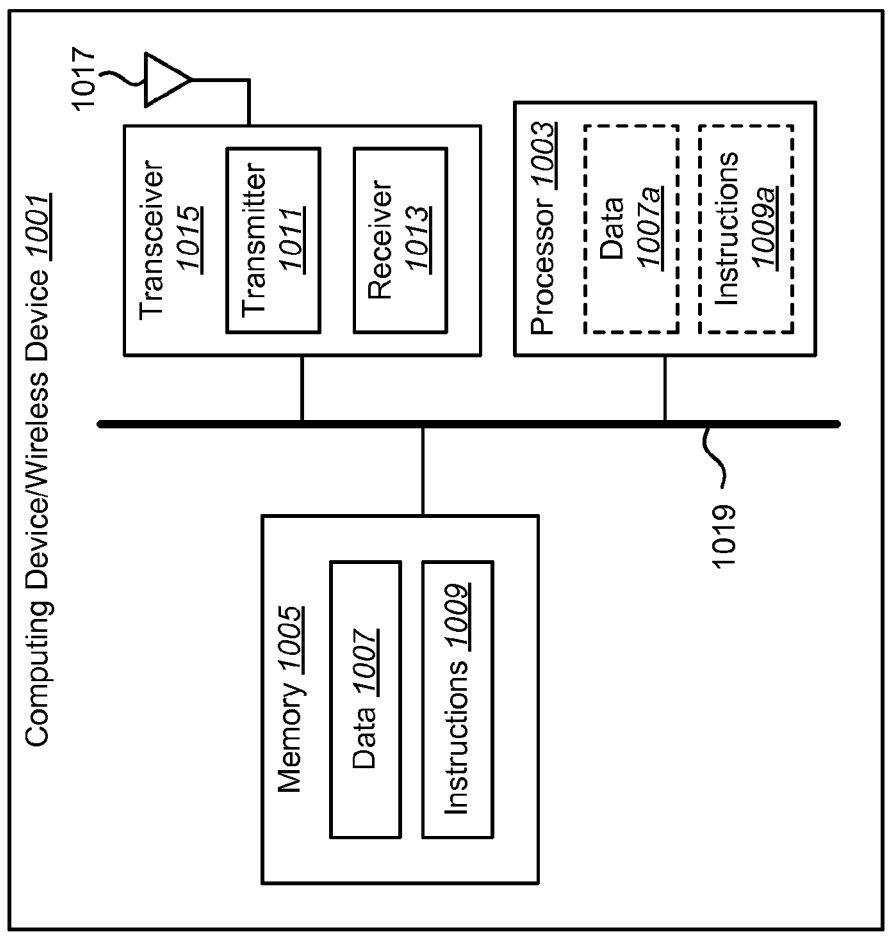
FIG. 10 illustrates certain components that may be included within a computing device/wireless device that is configured in accordance with the present disclosure.

FIG. 10 illustrates certain components that may be included within a computing device/wireless device 1001. The computing device/wireless device 1001 may be a wireless communication device and may implement the present systems and methods as disclosed herein.

The computing device/wireless device 1001 includes a processor 1003. The processor 1003 may be a general purpose single- or multi-chip microprocessor (e.g., an ARM), a special purpose microprocessor (e.g., a digital signal processor (DSP)), a microcontroller, a programmable gate array, etc. The processor 1003 may be referred to as a central processing unit (CPU). Although just a single processor 1003 is shown in the computing device/wireless device 1001 of FIG. 10, in an alternative configuration, a combination of processors (e.g., an ARM and DSP) could be used.

The computing device/wireless device 1001 also includes memory 1005. The memory 1005 may be any electronic component capable of storing electronic information. The memory 1005 may be embodied as random access memory (RAM), read-only memory (ROM), magnetic disk storage media, optical storage media, flash memory devices in RAM, on-board memory included with the processor, EPROM memory, EEPROM memory, registers, and so forth, including combinations thereof.

Data 1007 and instructions 1009 may be stored in the memory 1005. The instructions 1009 may be executable by the processor 1003 to implement the methods disclosed herein. Executing the instructions 1009 may involve the use of the data 1007 that is stored in the memory 1005. When the processor 1003 executes the instructions 1009, various portions of the instructions 1009a may be loaded onto the processor 1003, and various pieces of data 1007a may be loaded onto the processor 1003.

The computing device/wireless device 1001 may also include a transmitter 1011 and a receiver 1013 to allow transmission and reception of signals to and from the wireless device 1001. The transmitter 1011 and receiver 1013 may be collectively referred to as a transceiver 1015. An antenna 1017 may be electrically coupled to the transceiver 1015. The computing device/wireless device 1001 may also include multiple transmitters, multiple receivers, multiple transceivers and/or multiple antennas (not shown).

The various components of the computing device/wireless device 1001 may be coupled together by one or more buses, which may include a power bus, a control signal bus, a status signal bus, a data bus, etc. For the sake of clarity, the various buses are illustrated in FIG. 10 as a bus system 1019.

The term "coupled" encompasses a wide variety of connections. For example, the term "coupled" should be interpreted broadly to encompass circuit elements directly connected to each other and circuit elements indirectly connected via other circuit elements.

The techniques described herein may be used for various communication systems, including communication systems that are based on an orthogonal multiplexing scheme. Examples of such communication systems include Orthogonal Frequency Division Multiple Access (OFDMA) systems, Single-Carrier Frequency Division Multiple Access (SC-FDMA) systems, and so forth. An OFDMA system utilizes orthogonal frequency division multiplexing (OFDM), which is a modulation technique that partitions the overall system bandwidth into multiple orthogonal sub-carriers. These sub-carriers may also be called tones, bins, etc. With OFDM, each sub-carrier may be independently modulated with data. An SC-FDMA system may utilize interleaved FDMA (IFDMA) to transmit on sub-carriers that are distributed across the system bandwidth, localized FDMA (LFDMA) to transmit on a block of adjacent sub-carriers, or enhanced FDMA (EFDMA) to transmit on multiple blocks of adjacent sub-carriers. In general, modulation symbols are sent in the frequency domain with OFDM and in the time domain with SC-FDMA.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

The term "processor" should be interpreted broadly to encompass a general purpose processor, a central processing unit (CPU), a microprocessor, a digital signal processor (DSP), a controller, a microcontroller, a state machine, and so forth. Under some circumstances, a "processor" may refer to an application specific integrated circuit (ASIC), a programmable logic device (PLD), a field programmable gate array (FPGA), etc. The term "processor" may refer to a combination of processing devices, e.g., a combination of a DSP and a microprocessor, a plurality of microprocessors, one or more microprocessors in conjunction with a DSP core, or any other such configuration.

The term "memory" should be interpreted broadly to encompass any electronic component capable of storing electronic information. The term memory may refer to various types of processor-readable media such as random access memory (RAM), read-only memory (ROM), non-volatile random access memory (NVRAM), programmable read-only memory (PROM), erasable programmable read-only memory (EPROM), electrically erasable PROM (EEPROM), flash memory, magnetic or optical data storage, registers, etc. Memory is said to be in electronic communication with a processor if the processor can read information from and/or write information to the memory. Memory that is integral to a processor is in electronic communication with the processor.

The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may comprise a single computer-readable statement or many computer-readable statements.

The functions described herein may be implemented in hardware, software, firmware, or any combination thereof. If implemented in software, the functions may be stored as one or more instructions on a computer-readable medium. The terms "computer-readable medium" or "computer-program product" refers to any available medium that can be accessed by a computer. By way of example, and not limitation, a computer-readable medium may comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray® disc where disks usually reproduce data magnetically, while discs reproduce data optically with lasers.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

Further, it should be appreciated that modules and/or other appropriate means for performing the methods and techniques described herein, such as those illustrated by FIGS. 2, 4, 6 and 7, can be downloaded and/or otherwise obtained by a device. For example, a device may be coupled to a server to facilitate the transfer of means for performing the methods described herein. Alternatively, various methods described herein can be provided via a storage means (e.g., random access memory (RAM), read-only memory (ROM), a physical storage medium such as a compact disc (CD) or floppy disk, etc.), such that a device may obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the systems, methods, and apparatus described herein without departing from the scope of the claims.

What is claimed is:

1. A power supply comprising:
a synchronous sampled comparator comprising:
a first input receiving a reference voltage; and
a second input receiving a feedback signal, wherein the synchronous sampled comparator compares the reference voltage and the feedback signal at a sampling frequency;
power field effect transistors (FETs); and
an inductor coupled to the power FETs and coupled to the second input, wherein the power FETs generate a power supply voltage using the inductor, and wherein the power supply voltage is a direct current (DC) power supply voltage.

2. The power supply of claim 1, wherein the synchronous sampled comparator outputs a serial data stream corresponding to a relation between the reference voltage and the feedback signal.

3. The power supply of claim 2, further comprising gate drive circuitry, wherein the gate drive circuitry receives the serial data stream output by the synchronous sampled comparator.

4. The power supply of claim 3, wherein an output of the gate drive circuitry is input to the power FETs.

5. The power supply of claim 1, wherein the power FETs provide a current to the inductor to generate the power supply voltage.

6. The power supply of claim 1, wherein the feedback signal is the power supply voltage.

7. The power supply of claim 1, wherein the synchronous sampled comparator outputs a serial data stream with a switching frequency, and wherein the switching frequency produces a frequency on the power supply voltage.

8. The power supply of claim 7, wherein the switching frequency is less than the sampling frequency.

9. The power supply of claim 7, further comprising a programmable delay line, wherein the programmable delay line introduces a delay into the serial data stream that reduces the frequency of the serial data stream.

10. The power supply of claim 9, further comprising:
a frame length counter, wherein the frame length counter determines a frame length of the switching frequency;
a comparison module, wherein the comparison module compares the frame length of the switching frequency with a desired frame length; and
an integrator, wherein the integrator determines an incremental increase/decrease to the delay that adjusts the frame length towards the desired frame length.

11. The power supply of claim 10, wherein the desired frame length corresponds to a desired frequency of operation, wherein the power supply is used in a computing device, and wherein the desired frequency of operation is selected to avoid interference with other frequencies used by the computing device.

12. The power supply of claim 1, wherein the power supply is a synchronously sampled single bit switch mode power supply.

13. The power supply of claim 1, wherein the power supply provides the power supply voltage to a processor.

14. The power supply of claim 13, wherein the power supply and the processor are located on the same integrated circuit.

15. The power supply of claim 1, wherein the sampling frequency is generated using a delay locked loop (DLL).

16. A method for providing a power supply voltage comprising:
generating a serial data stream signal using a synchronous sampled comparator, wherein the synchronous sampled comparator compares a reference voltage and a feedback signal at a sampling frequency and outputs the serial data stream with a switching frequency;
providing a current to an inductor using power field effect transistors (FETs) to obtain a power supply voltage;
adjusting the current provided to the inductor using the serial data stream; and
feeding back the power supply voltage to the synchronous sampled comparator.

17. The method of claim 16, further comprising providing the power supply voltage to a processor.

18. The method of claim 16, wherein the synchronous sampled comparator comprises:
a first input receiving the reference voltage; and
a second input receiving the feedback signal, and wherein the synchronous sampled comparator generates the serial data stream corresponding to a relation between the reference voltage and the feedback signal.

19. The method of claim 16, wherein providing a current to an inductor comprises:
providing the serial data stream to gate drive circuitry; and
providing a gate drive circuitry output to the power FETs, wherein the power FETs incrementally increase or decrease the current according to the serial data stream.

20. The method of claim 16, wherein the switching frequency of the serial data stream produces a frequency on the power supply voltage, and further comprising introducing a delay to the serial data stream, wherein the delay reduces the switching frequency of the serial data stream.

21. The method of claim 20, wherein the delay is introduced to the serial data stream by a programmable delay line.

22. The method of claim 20, further comprising:
determining a frame length of the switching frequency;
comparing the frame length with a desired frame length;
determining an incremental increase/decrease to the delay that adjusts the frame length toward the desired frame length; and
adjusting the delay introduced to the serial data stream by the incremental increase/decrease.

23. The method of claim 22, wherein the desired frame length corresponds to a desired frequency of operation, wherein the power supply is used in a computing device, and wherein the desired frequency of operation is selected to avoid interference with other frequencies used by the computing device.

24. The method of claim 16, wherein the method is performed by a synchronously sampled single bit switch mode power supply.

25. The method of claim 24, further comprising providing the power supply voltage to a processor, wherein the synchronously sampled single bit switch mode power supply and the processor are located on the same integrated circuit.

26. The method of claim 16, wherein the sampling frequency is generated using a delay locked loop (DLL).

27. A computing device configured for providing a power supply voltage comprising:
means for generating a serial data stream signal using a synchronous sampled comparator, wherein the synchronous sampled comparator compares a reference voltage and a feedback signal at a sampling frequency and outputs the serial data stream with a switching frequency;
means for providing a current to an inductor using power field effect transistors (FETs) to obtain a power supply voltage;

means for adjusting the current provided to the inductor using the serial data stream; and means for feeding back the power supply voltage to the synchronous sampled comparator.

28. The computing device of claim 27, wherein the synchronous sampled comparator comprises:

a first input receiving the reference voltage; and a second input receiving the feedback signal, and wherein the synchronous sampled comparator generates the serial data stream corresponding to a relation between the reference voltage and the feedback signal.

29. The computing device of claim 27, wherein the means for providing a current to an inductor comprises:

means for providing the serial data stream to gate drive circuitry; and means for providing a gate drive circuitry output to the power FETs, wherein the power FETs incrementally increase or decrease the current according to the serial data stream.

30. A non-transitory computer-readable medium encoded with computer-executable instructions, wherein execution of the computer-executable instructions is for:

generating a serial data stream signal using a synchronous sampled comparator, wherein the synchronous sampled comparator compares a reference voltage and a feedback signal at a sampling frequency and outputs the serial data stream with a switching frequency;

providing a current to an inductor using power field effect transistors (FETs) to obtain a power supply voltage;

adjusting the current provided to the inductor using the serial data stream; and feeding back the power supply voltage to the synchronous sampled comparator.

31. The computer-readable medium of claim 30, wherein the synchronous sampled comparator comprises:

a first input receiving the reference voltage; and a second input receiving the feedback signal, and wherein the synchronous sampled comparator generates the serial data stream corresponding to a relation between the reference voltage and the feedback signal.

32. The computer-readable medium of claim 30, wherein providing a current to an inductor comprises:

providing the serial data stream to gate drive circuitry; and providing a gate drive circuitry output to the power FETs, wherein the power FETs incrementally increase or decrease the current according to the serial data stream.

* * * * *